United States Patent
Turtinen et al.

(10) Patent No.: US 11,849,497 B2
(45) Date of Patent: Dec. 19, 2023

(54) METHODS, DEVICES, AND MEDIUM FOR HANDLING OF NON-SDT DATA

(71) Applicant: Nokia Technologies Oy, Espoo (FI)

(72) Inventors: Samuli Heikki Turtinen, Ii (FI); Jussi-Pekka Koskinen, Oulu (FI); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/718,073

(22) Filed: Apr. 11, 2022

(65) Prior Publication Data
US 2022/0330372 A1 Oct. 13, 2022

(30) Foreign Application Priority Data

Apr. 12, 2021 (WO) ................ PCT/CN2021/086697

(51) Int. Cl.
*H04W 76/19* (2018.01)
*H04W 76/20* (2018.01)
*H04L 1/08* (2006.01)
*H04W 80/02* (2009.01)

(52) U.S. Cl.
CPC .............. *H04W 76/19* (2018.02); *H04L 1/08* (2013.01); *H04W 76/20* (2018.02); *H04W 80/02* (2013.01)

(58) Field of Classification Search
CPC ..... H04W 76/19; H04W 76/20; H04W 80/02; H04L 1/08
See application file for complete search history.

(56) References Cited

U.S. PATENT DOCUMENTS

| | | | |
|---|---|---|---|
| 2014/0334380 A1 | 11/2014 | Pinheiro et al. | |
| 2017/0251516 A1 | 8/2017 | Bangolae et al. | |
| 2018/0302914 A1 | 10/2018 | da Silva et al. | |
| 2018/0324869 A1* | 11/2018 | Phuyal | H04W 72/14 |

(Continued)

FOREIGN PATENT DOCUMENTS

| | | |
|---|---|---|
| CN | 106658601 A | 5/2017 |
| CN | 109952747 A | 6/2019 |

(Continued)

OTHER PUBLICATIONS

"3rd Generation Partnership Project; Technical Specification Group Core Network and Terminals; Non-Access-Stratum (NAS) protocol for 5G System (5GS); Stage 3; (Release 17)", 3GPP TS 24.501 v17.2.1, (Apr. 9, 2021), 758 pages.

"3rd Generation Partnership Project; Technical Specification Group Radio Access Network; NR; Radio Resource Control (RRC) protocol specification (Release 16)", 3GPP TS 38.331 v16.4.1, (Mar. 30, 2021), 949 pages.

(Continued)

*Primary Examiner* — Will W Lin
(74) *Attorney, Agent, or Firm* — ALSTON & BIRD LLP (57) ABSTRACT

Example embodiments of the present disclosure relate to UP transmission for a device in an inactive state. The first device in an inactive state performs a small data transmission procedure between the first device and a second device and transmits an indication to the second device. The indication indicates the following a presence of non-small data transmission data to be transmitted by the first device and information associated with the data. Through this solution, the second device may make a proper and reasonable determination about whether to resume a radio resource control connection with the terminal device and whether to stop the ongoing small data transmission procedure.

37 Claims, 6 Drawing Sheets

(56) References Cited

U.S. PATENT DOCUMENTS

| | | | | |
|---|---|---|---|---|
| 2019/0104553 | A1* | 4/2019 | Johansson | H04W 74/0833 |
| 2019/0208411 | A1* | 7/2019 | Shrestha | H04L 9/0861 |
| 2019/0223221 | A1* | 7/2019 | Johansson | H04W 68/02 |
| 2020/0187245 | A1* | 6/2020 | Fujishiro | H04W 72/0413 |
| 2021/0014899 | A1* | 1/2021 | Shih | H04W 74/0833 |
| 2021/0051734 | A1* | 2/2021 | Chang | H04W 72/14 |
| 2021/0160791 | A1* | 5/2021 | Sha | H04W 52/365 |
| 2021/0235265 | A1* | 7/2021 | Stattin | H04W 76/18 |
| 2021/0307055 | A1* | 9/2021 | Tsai | H04W 76/27 |
| 2021/0307060 | A1* | 9/2021 | Agiwal | H04W 74/0833 |
| 2021/0337625 | A1* | 10/2021 | Tsai | H04W 76/19 |
| 2022/0039060 | A1* | 2/2022 | Chang | H04W 12/0433 |
| 2022/0039068 | A1* | 2/2022 | Hoglund | H04W 74/008 |
| 2022/0039192 | A1* | 2/2022 | Palat | H04W 76/30 |
| 2022/0095136 | A1* | 3/2022 | Beale | H04L 1/0035 |
| 2022/0104306 | A1* | 3/2022 | Shrestha | H04W 76/27 |
| 2022/0201744 | A1* | 6/2022 | Shrestha | H04W 68/02 |

FOREIGN PATENT DOCUMENTS

| | | | |
|---|---|---|---|
| WO | WO 2020/088097 A1 | 5/2020 | |
| WO | WO 2022/074502 A1 | 4/2022 | |

OTHER PUBLICATIONS

International Search Report and Written Opinion for Patent Cooperation Treaty Application No. PCT/CN2021/086697 dated Jan. 14, 2022, 9 pages.

Potevio, "Handling of Non-SDT Data Arrival", 3GPP TSG-RAN WG2 #113 Bis-3, R2-2103151, (Apr. 12-20, 2021), 3 pages.

ZTE Corporation, "Summary of General and other control plane open issues for SDT (email: [Post 113-e][502])", 3GPP TSG-RAN2 Meeting #113-bis-e, R2-2103022, (Apr. 12-20, 2021), 21 pages.

ZTE Corporation, "Work Item on NR Small Data Transmissions in Inactive State", 3GPP TSG RAN Meeting #86, RP-193252, (Dec. 9-12, 2019), 4 pages.

Extended European Search Report for European Application No. 22167335.3 dated Aug. 30, 2022, 10 pages.

Qualcomm Incorporated, "RACH Based NR Small Data Transmission", 3GPP TSG-RAN WG2 Meeting #111e, R2-2007540, (Aug. 17-28, 2020), 5 pages.

Office Action for Taiwanese Application No. 111113513 dated Nov. 25, 2022, 19 pages.

Office Action for Chinese Application No. 202210373872.7 dated May 31, 2023, 8 pages.

* cited by examiner

METHODS, DEVICES, AND MEDIUM FOR HANDLING OF NON-SDT DATA

CROSS-REFERENCE TO RELATED APPLICATIONS

This application claims priority to International Application No. PCT/CN2021/086697 filed Apr. 12, 2021, the entire contents of which are incorporated herein by reference.

FIELD

Embodiments of the present disclosure generally relate to the field of telecommunication, and in particular, to methods, devices, and medium for handling of non-SDT data.

BACKGROUND

Power consumption of a terminal device is a focus in current wireless communication system. In order to reduce power consumption of the terminal device, it is proposed that the terminal device may be configured in some power saving states (such as, inactive state). As for a terminal device in an inactive state, normal data transmissions are proposed to be suspended. Generally speaking, if the terminal device in the inactive state needs to perform data transmission with a network device, the terminal device has to resume a connection (i.e., wake up and transform into a connected state), and perform either a downlink (DL) transmission or an uplink (UL) transmission on the established connection. Upon completing the data transmissions, the terminal device will release the connection and re-enter into the inactive state. The procedures for establishing and releasing connection are necessary for each data transmission including small and infrequent data transmission with periodic and/or non-periodic, which results in unnecessary power consumption and signalling overhead.

In order to further reduce power consumption, a solution for enabling small data transmission (SDT) for the terminal device in the inactive state is proposed by a work item of the third Generation Partnership Project (3GPP). By using SDT, the terminal device in the inactive state may maintain the inactive state while enabling a SDT. Further, when the terminal device is performing a SDT transmission with network device, the terminal possibly has a requirement to perform normal data transmission (also referred to as "non-SDT"), which means that the terminal needs to transform into a connected state. The solution about such scenario is desirable to be discussed.

SUMMARY

In general, example embodiments of the present disclosure provide a solution for handling of non-SDT data. Embodiments that do not fall under the scope of the claims, if any, are to be interpreted as examples useful for understanding various embodiments of the disclosure.

In a first aspect, there is provided a first device. The first device comprises at least one processor; and at least one memory including computer program code; where the at least one memory and the computer program code are configured to, with the at least one processor, cause the first device to perform a small data transmission procedure between the first device in an inactive state and a second device. The at least one memory and the computer program code are further configured to transmit, to the second device, an indication indicating the following: a presence of non-small data transmission data to be transmitted by the first device and information associated with the data.

In a second aspect, there is provided a second device. The second device comprises at least one processor; and at least one memory including computer program code; where the at least one memory and the computer program code are configured to, with the at least one processor, cause the second device to perform a small data transmission procedure between a first device in an inactive state and the second device. The at least one memory and the computer program code are further configured to receive, from the first device, an indication indicating the following: a presence of non-small data transmission data to be transmitted by the first device and information associated with the data.

In a third aspect, there is provided a method. The method comprises performing at a first device a small data transmission procedure between the first device in an inactive state and a second device. The method further comprises transmitting, to the second device, an indication indicating the following: a presence of non-small data transmission data to be transmitted by the first device and information associated with the data.

In a fourth aspect, there is provided a method. The method comprises performing at a second device a small data transmission procedure between a first device in an inactive state and the second device. The method further comprises receiving, from the first device, an indication indicating the following: a presence of non-small data transmission data to be transmitted by the first device and information associated with the data.

In a fifth aspect, there is provided a first apparatus. The first apparatus comprises means for performing at a first apparatus a small data transmission procedure between the first apparatus in an inactive state and the second device. The first apparatus further comprises means for transmitting, to the second device, an indication indicating the following: a presence of non-small data transmission data to be transmitted by the first apparatus in a connected state and information associated with the data.

In a sixth aspect, there is provided a second apparatus. The second apparatus comprises means for means for performing at a second apparatus a small data transmission procedure between a first apparatus in an inactive state and the second device. The second apparatus further comprises means for receiving, from the first device, an indication indicating the following: a presence of non-small data transmission data to be transmitted by the first apparatus in a connected state and information associated with the data.

In a seventh aspect, there is provided a computer readable medium. The computer readable medium comprises program instructions for causing an apparatus to perform at least the method according to the third aspect.

In an eighth aspect, there is provided a computer readable medium. The computer readable medium comprises program instructions for causing an apparatus to perform at least the method according to the fourth aspect.

It is to be understood that the summary section is not intended to identify key or essential features of embodiments of the present disclosure, nor is it intended to be used to limit the scope of the present disclosure. Other features of the present disclosure will become easily comprehensible through the following information associated with the data.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology.

As used herein, the term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As used herein, the term "small data transmission data" or "SDT data" refers to the data that could be transmitted by a terminal device in the inactive mode and in the connected mode.

As used herein, the term "non-small data transmission data" or "non-SDT data" refers to the data that is not allowed to be transmitted during a SDT procedure. Generally speaking, the "non-small data transmission data" or "non-SDT data" is carried in a radio bearer (including signaling radio bearer (SRB) and data signaling radio bearer (DRB)) which is not configured for SDT, or resulted/trigged by a service/function/application which is not configured for SDT.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

As discussed above, in order to reduce power consumption for a terminal device in the wireless communication, the terminal device may be configured in some power saving states. For example, a Radio Resource Control (RRC) inactive state has been proposed and defined by a work item of the 3GPP. Generally speaking, if the terminal device in the inactive state needs to perform data transmission with a network device, the terminal device has to resume the RRC connection (i.e., wake up and transform into a connected state), and performs either a DL transmission or an uplink UL transmission on the resumed connection. Upon completing the data transmissions, the terminal device will release the RRC connection and re-enter into the inactive state. The above resuming and releasing procedures are necessary even for infrequent (periodic and/or non-periodic) small data transmissions, which results in unnecessary power consumption and signalling overhead.

Further, it is required that the NR should be efficient and flexible for low throughput short data bursts, support efficient signalling mechanisms (for example, signalling is less than payload), and reduce signalling overhead in general. Therefore, signalling overhead from the terminal device for small data packets is a general problem and will become a critical issue with more terminal devices in NR not only for network performance and efficiency but also for the battery performance of the terminal device.

As discussed above, in order to further reduce power consumption, a solution for enabling SDT for the terminal device in the RRC inactive state is proposed by a work item of the 3GPP, such that the terminal device in the RRC inactive state may maintain the inactive RRC state while enabling a data transmission. In general, any device that has intermittent small data packets in the RRC inactive state will benefit from enabling SDT.

Some example application scenarios of SDT for a smart terminal device may include, but not limited to the following:

Traffic/data/packet from instant messaging services (for example, whatsapp, QQ, wechat, MSN, and the like);

Heart-beat/keep-alive traffic/data/packet from some applications (for example, instant application, email application, and the like); and Push notifications from various applications.

Some example application scenarios of SDT for a non-smart terminal device may include, but not limited to the following:

Traffic/data/packet from wearables (for example, periodic positioning information, reference signal, and the like);

Traffic/data/packet from sensors (for example, temperature sample, pressure sample, and the parameter from industrial wireless sensor networks); and Periodic meter readings from smart mete device and smart meter network device.

One proposed solution for enabling SDT is implemented by using random access channel (RA) procedure including 2-step RACH and 4-step RACH (also referred to as RACH-based scheme or RA-SDT scheme). More specifically, SDT data may be transmitted via message A (Msg A) of 2-step RACH and message 3 (Mag 3) of 4-step RACH to the network device by the terminal device in the RRC inactive state. The RACH-based scheme is considered as a general procedure to enable small data transmission from the terminal device in the RRC inactive state. Further, the RACH-based scheme enables flexible payload sizes larger than the regular common control channel (CCCH) message size. In addition, some focuses (such as, context fetch, data forwarding with or without anchor relocation and security) are also have been discussed by the 3GPP.

Another proposed solution for enabling SDT is implemented by transmitting the SDT data on pre-configured physical uplink shared channel (PUSCH) resources (i.e. reusing the configured grant type 1) when the timing advance (TA) is valid. This solution is considered as a general procedure for SDT over configured grant type 1 resources.

In addition, during the SDT, in addition to an SDT initiation, UL/DL SDT data following the SDT initiation (also referred to as subsequent transmission(s) hereafter) without transitioning to RRC connected state is also supported. For example, the terminal device sends multiple UL and DL packets as part of the same SDT procedure and without transitioning into the RRC connected state when the terminal device is in the RRC inactive state.

Further, it is proposed that no new RRC state should be introduced and the subsequent transmission(s) of the SDT in UL and DL and the state transition decisions should be controlled by the network device.

Further, as discussed above, when the terminal device is performing a SDT procedure with the network device, the terminal possibly has a requirement to perform normal data transmission (i.e., non-SDT) upon data arrival on a bearer that is not allowed to be transmitted with SDT.

In conventional solutions, upon detecting a normal data transmission in the buffer, the terminal device in the RRC inactive state (such as, 5G mobility management connected (5GMM-CONNECTED) state, or 5GMM-CONNECTED state with RRC inactive indication), the NAS of the terminal device shall categorize the corresponding access attempt into access identities and an access category, and provides the access identities and the access category to the lower layers for the purpose of access control checking. The NAS can also provide to the lower layer the RRC establishment cause in related request to the lower layer. However, the conventional solutions are stipulated for RRC connected state, and further only relate to the internal interactions between the NAS and the AS.

Further, as discussed above, if the terminal device in the RRC inactive state wants to perform a non-SDT, the terminal device has to resume the RRC connection with the network device. Therefore, the interaction between the terminal device and the network is necessary. One possible solution is that if non-SDT data arrives during SDT, the RRC layer will generate a dedicated control channel (DCCH) message and submit the DCCH message to the lower layers (such as, media access control, MAC) layer). The MAC layer will include the DCCH message in an UL transmission after contention resolution. In addition, if the contention resolution fails, a new RACH procedure will be triggered by the MAC layer and the DCCH message can be sent when the RACH procedure is complete.

Generally speaking, if the network device is under a higher load situation, the network device may not intend to bring the UE into the RRC connected state unless necessary. However, in the above possible solution, in addition to the presence of the data, the network device cannot obtain any additional information about the data. Therefore, the network device cannot make a proper and suitable determination about whether to resume the RRC connection or continue the ongoing SDT. In view of the above, a solution about such scenario where a non-SDT arrives during a SDT is desirable to be discussed.

In this solution of the present disclosure, in addition to indicating the presence of non-small data transmission data needed to be transmitted by the first device (such as, a terminal device) in a connected state (i.e., non-SDT transmission), the first device also indicates information associated with the data to a second device (such as, a network device), such that the second device may make a proper and reasonable determination about whether to resume the RRC connection with the first device and whether to stop the ongoing SDT. This solution especially benefits the scenario where the network device is in an overload situation.

Figure 1:
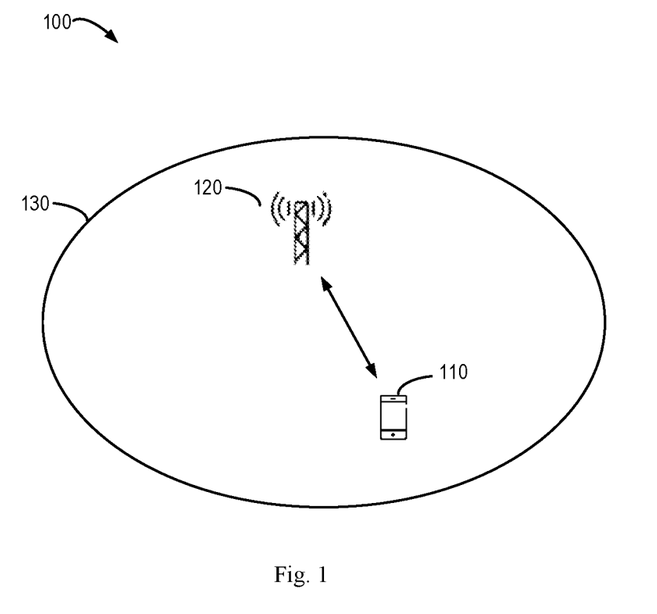
FIG. 1 illustrates an example communication environment in which example embodiments of the present disclosure can be implemented.

FIG. 1 shows an example communication environment 100 in which example embodiments of the present disclosure can be implemented. In the communication environment 100, a first device 110 can communicate with a second device 120 via physical communication channels or links. In the specific example of FIG. 1, the first device 110 is illustrated as a terminal device. The second device 120 is illustrated as a network device serving the first device 110. The serving area provided by the second device 120 is called as cell 130.

In the environment 100, a link from the first device 110 to the second device 120 is referred to as an UL, while a link from the second device 120 to the first device 110 is referred to as a DL. In UL, the first device 110 is a TX device (or a transmitter) and the second device 120 is a RX device (or a receiver). In DL, the second device 120 is a transmitting (TX) device (or a transmitter) and the first device 110 is a receiving (RX) device (or a receiver).

In the specific example of FIG. 1, the first device 110 may be in different states (such as, connected state and inactive state). When the first device 110 is in the inactive state, a SDT is supported while a normal data transmission (i.e., non-SDT) is not allowed during a SDT procedure. Further, a first device 110 in the inactive state may transform into the connecting state by resuming/establishing a RRC connection with the second device 120. Such transformation procedure may be initiated by either the first device 110 or the second device 120.

The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

It is to be understood that the numbers of first device, second device and cell are only for the purpose of illustration without suggesting any limitations. The communication environment 100 may include any suitable first device, second network device and cell adapted for implementing embodiments of the present disclosure. Although not shown, it is to be understood that one or more additional second devices may be located in the respective cells. It would also be appreciated that in some examples, only the homogeneous network deployment or only the heterogeneous network deployment may be included in the environment 100.

Principle and implementations of the present disclosure will be described in detail below with reference to FIG. 2, which shows example signaling charts 200 for the method for handling of non-SDT data in accordance with some embodiments of the present disclosure. The method may be implemented at any suitable devices according to the specific implements.

Further, in the following descriptions, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Figure 2:
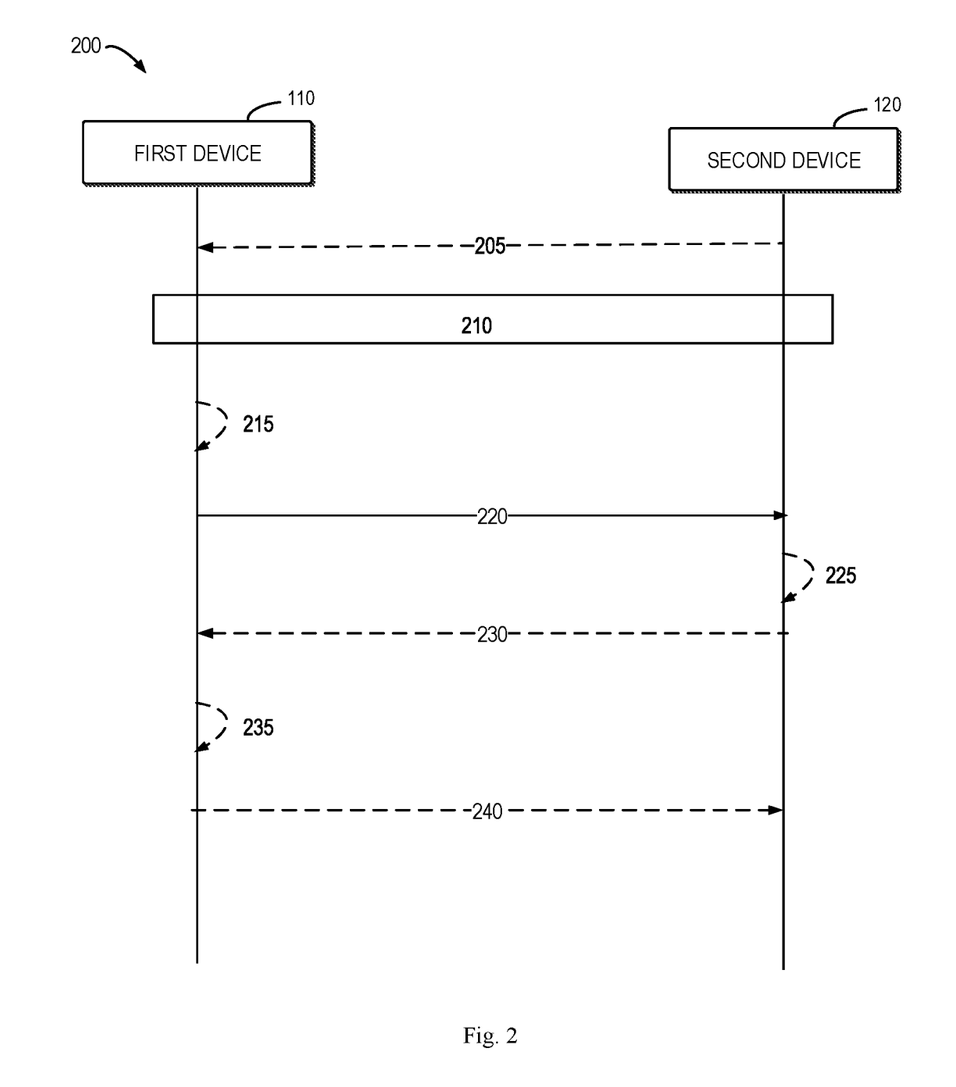
FIG. 2 illustrates a signaling flow for handling of non-SDT data according to some example embodiments of the present disclosure.

In the specific example of FIG. 2, the first device 110 is a terminal device and the second device 120 is a network device. Further, the first device 110 is in an inactive state (such as, RRC inactive state).

The first device 110 may support multiple applications, services and functions (such as, emergency, highPriorityAccess, mt-Access, mo-VoiceCall, mo-VideoCall, mo-SMS, ma-Update, mps-PriorityAccess, or mcs-PriorityAccess), and the different applications, services and functions may result in different data. Further, when the first device 110 requests to resume the RRC connection or indicates the presence of the data, the first device 110 may use suitable parameters to indicate the cause(s) resulting in the data.

Further, different data may be carried through different radio bearers including signaling radio bearer (SRB) and data signaling radio bearer (DRB). As a result, the specific radio bearer also could reflect the details of the data.

In addition, different data may have different priorities. For example, the data resulted by an emergency call may be configured with a high priority. The priorities of the different data may be pre-defined by the communication network.

In addition, data resulted by some certain applications, services and functions supports be transmitted via both SDT procedure and non-SDT procedure, while the other data may be transmitted merely via a non-SDT procedure.

In the specific example of FIG. 2, the first device 110 is performing 205 a SDT procedure with the second device 120. The SDT procedure may be a RA-based SDT procedure. Specifically, the first device 110 has transmitted message 1 to the second device 120 during a 4-step RA procedure, or has transmitted a Msg A to the second device 120 during a 2-step RA procedure. Additionally, subsequent UL/DL SDT may also be performed between the first device 110 and the second device 120.

Alternatively, the first device 110 may also perform the ongoing SDT procedure on the pre-configured resources (such as, PUSCH) for SDT data. Alternatively, the first device 110 may has received a contention resolution completion message from the second device 120.

By supporting SDT, the first device 110 may enable data transmission with the second device 120 while continue to maintain a power saving state.

During the SDT procedure, new data may be generated over time. If the first device 110 determines that there is data to be transmitted to the second device 120 during the SDT procedure, the first device 110 needs to determine whether the data can be transmitted through SDT procedure. If the first device 110 determines that the newly generated data is preferred to be transmitted through non-SDT, the first device 110 needs to resume the RRC connection with the second device 120, such that the first device 110 may transform into a connected state thereby.

In order to resume the RRC connection with the second device 120, the first device 110 transmits 220 an indication to the second device 120. In some example embodiments, the indication may indicate a presence of non-SDT data to be transmitted by the first device 110 in a connected state. It is to be understood that the first device 110 may indicate the presence of the data in either an explicitly manner or implicitly manner.

Additionally, the indication may further indicate information associated with the data. After receiving the indication, the second device 120 determines 225 whether to resume the RRC connection between the first device 110 and the second device 120 based on the information associated with the data. Then, the second device 120 transmits 230 a response indicating whether the RRC connection is resumed to the first device 110.

In some example, the indication may be carried in a request transmitted from the first device 110 to the second device 120. For example, a request for resuming the RRC connection between the first device 110 and the second device 120. Alternatively, the indication may be carried in a notification transmitted from the first device 110 to the second device 120. It is to be understood that the above examples for carrying the indication are only for the purpose of illustration without suggesting any limitations. In other example embodiments, the indication may be carried in an existing or newly-defined message/signalling with any suitable type.

In this way, the first device 110 may indicate the information associated with the data, and the information associated with the data indicates different aspects of the data. By using the information associated with the data, the second device 120 may make a proper and reasonable determination with regard to the indication.

The information associated with the data may be represented by any suitable parameters. In some example embodiments, the information associated with the data indicates a radio bearer (such as, SRB and DRB) corresponding to the data. Alternatively, or in addition, the information associated with the data indicates a priority of the data.

Alternatively, or in addition, the information associated with the data indicates a cause resulting in the data. By way of example rather than limitation, examples of the cause are emergency, highPriorityAccess, mt-Access, mo-VoiceCall, mo-VideoCall, mo-SMS, rna-Update, mps-PriorityAccess, or mcs-PriorityAccess. In some example embodiments, the cause may be represented as a cause for establishing the RRC connection. Alternatively, the cause may be represented as a cause for resuming the RRC connection. Alternatively, the cause may be represented as a cause for re-establishing the RRC connection. The causes discussed herein may be a cause that stipulated in the 3GPP standards, or a new cause defined according to the specific requirements. In this way, the existing information element (IE) that carrying the cause for establishing/resuming/re-establishing RRC connection may be reused.

In this way, the total performance of the network device may be improved. Specifically, in addition to the first device 110, the second device 120 may also provide service to other terminal devices. As a result, the second device 120 may receive multiple indications that indicate the presence of non-SDT data from the terminal devices. However, the second device 120 may not support to resume all the RRC connections due to an overload state. By using the information associated with the data indicated in the indications from respective terminal devices, the second device 120 may properly determine which data should be transmitted preferentially, and then resumes the connection with the terminal device corresponding to the data.

Additionally, before transmitting the indication for the data, the first device 110 may determines 215 whether the first device is allowed to transmit the indication first. Only in case that the first device 110 determines that the first device 110 is allowed to indicate the presence of the data, the first device 110 transmits the indication to the second device 120.

In some example embodiments, the first device 110 determines whether the first device 110 is allowed to transmit the indication according to a configuration. In some example embodiments, the configuration may indicate information associated with the data for which the first device is allowed to transmit the indication. More specifically, the configuration may indicate one or more radio bearers, and when the first device 110 determines that the data is carries through the radio bearer indicated by the configuration, the first device 110 may transmit the indication for the data. Alternatively, or in addition, the configuration may indicate a priority, and when the first device 110 determines that the priority of the data is higher than the priority indicated by the configuration, the first device 110 may transmit the indication for the data. Alternatively, or in addition, the configuration may indicate one or more causes resulting in the data, and when the first device 110 determines that the cause resulting in the data belongs to one of the one or more causes indicated by the configuration, the first device 110 may transmit the indication for the data.

Alternatively, in some example embodiments, the configuration may indicate information associated with the data for which the first device 110 is not allowed to transmit the indication. More specifically, the configuration may indicate one or more radio bearers, and when the first device 110 determines that the data is carries through the radio bearer indicated by the configuration, the first device 110 disables the transmission the indication for the data. Alternatively, or in addition, the configuration may indicate a priority, and when the first device 110 determines that the priority of the data is lower than the priority indicated by the configuration, the first device 110 disables the transmission the indication for the data. Alternatively, or in addition, the configuration may indicate one or more causes, and when the first device 110 determines that the cause resulting in the data belongs to one of the one or more causes indicated by the configuration, the first device 110 disables the transmission the indication for the data.

It is to be understood that the configuration may indicate any suitable policy or rule which would be used by the first device 110 for determining whether the first device 110 is allowed to transmit the indication. In this way, by using the configuration, unnecessary transmission of the indication may be avoided.

In some example embodiments, the first device 110 may obtain the configuration from the second device 120. More specifically, the second device 120 may configure for which causes, DRBs, SRBs and priorities the first device 110 is allowed to transmit the indication to indicate the data to be transmitted at the first device 110. Alternatively, the second device 120 may configure for which causes, DRBs, SRBs and priorities the first device 110 is not allowed to transmit the indication to indicate the data to be transmitted at the first device 110. Then the second device 120 may transmit 205 the configuration to the first device.

In this way, the transmission of the indication can be controlled by the second device 120 (i.e., the network device). In addition, the second device may provide different configurations to different terminal devices or different areas. Therefore, the second device 120 may provide the personalized services to the terminal devices.

In some example embodiments, the configuration is pre-defined at the first device 110. More specifically, the communication network may pre-define the configuration, or the communication standards (such as, 3GPP standards) stipulate the configuration. In this event, the configuration may be represented as file, program, or instructions in a local storage device of the first device 110. In this way, the transmission of the indication may be controlled without any additional message interaction.

In some example embodiments, the determination about whether the indication is allowed to be transmitted is performed by a NAS of the first device 110. More specifically, the NAS obtains the configuration from an AS of the first device 110. For example, the AS of the first device 110 indicates to the NAS which causes, access classes or categories are allowed. When there is a data to be transmitted in the buffer, the NAS determines whether the indication is allowed to be transmitted according to the obtained configuration.

In some example embodiments, if the NAS determines that the indication for the data is allowed to be transmitted, the NAS indicates presence of the data to the AS. The AS may initiate to transmit the indication accordingly. In this way, the unnecessarily internal interaction between the NAS and the AS is avoided.

Alternatively, if the NAS determines that the indication for the data is not allowed to be transmitted, the NAS disables indicating presence of the data to the AS by the non-access stratum. Further, the NAS may be triggered to enable indicating presence of the data to the AS later. In some example embodiments, if the NAS receives an indication that a SDT between the first device 110 and the second device 120 is complete, the NAS enables indicating the presence of the data to the access stratum by the non-access stratum.

In this way, even if the first device 110 cannot indicate the present of the non-SDT data to the second device immediately, the first device also may inform the second device 120 the present of the data in time.

Additionally, the first device 110 may maintains different timers for different transmissions. In some example embodiments, the first device 110 may maintain a timer for SDT procedure (such as, a T319-like timer). More specifically, the first device 110 may start the timer for SDT procedure upon a transmission of the SDT, and in response to an expiration of the timer for SDT, indicates the expiration of the timer for SDT to the upper layer (such as, NAS).

Additionally, the first device 110 may also maintain a timer for the indication (referred to as second timer hereafter). More specifically, the first device 110 starts the second timer for the indication upon transmission of the indication, and in response to an expiration of the second timer, indicates the expiration of the second timer to an upper layer (such as, NAS). Additionally, the second timer may be stopped upon reception of RRCResume, RRCSetup, RRCRelease, RRCRelease with suspendConfig or RRCReject message, cell re-selection and upon abortion of connection establishment.

In this way, the upper layer can be informed which timer expires and/or the cause for releasing/failure of the RRC connection.

In some example embodiments, the second timer is T319. By reusing the existing T319 timer, it is unnecessary to introduce a new timer for maintaining the transmission of the indication.

Additionally, if the first device 110 determines that the response indicating that the RRC is not resumed, the first device 110 may re-transmit the indication later. In some example embodiments, the re-transmission is controlled with a re-transmission timer (also referred to as "first timer"). More specifically, the first device 110 starts 235 the first timer upon receipt of the response indicating that the RRC connection is not resumed, and re-transmits 240 the indication to the second device 120 in response to an expiration of the first timer.

In some example embodiments, the first device 110 determines duration of the first timer is determined from the response. More specifically, when the second device 120 determines not to resume the RRC connection with the first device 110, in addition to indicating whether the connection is resumed, the second device 120 further indicates the duration of the first timer. When the first device 110 receives the response, the first device 110 may be informed that the connection between the first device 110 and the second device 120 is not resumed, while the first device 110 also is informed that a re-transmission of the indication is allowable. Then, the first device 110 may perform the re-transmission of the indication with the first timer. Alternatively, the duration of the first timer may be a locally pre-configured value. In other words, the duration of the first timer may be pre-configured by the communication network or stipulated in the wireless communication standards.

In some example embodiments, the first device 110 may perform a one-shot re-transmission of the indication. Alternatively, the first device 110 may perform the re-transmission of the indication periodically with duration of the first timer.

By using the first timer, unnecessary and frequent re-transmission of the indication is avoided.

Alternatively, the re-transmission of the indication may be triggered by one or more specific events. One example of the specific events may be a completion of a SDT procedure between the first device 110 and the second device 120. More specifically, if the first device 110 is performing SDT procedure when receiving the response indicating that the RRC connection is not resumed, the first device 110 may disable re-transmission the indication. Further, when the first device 110 determines that the ongoing SDT procedure is complete, the first device 110 may re-transmit the indication. It is to be understood that the above example event for triggering the retransmission of the indication is only for the purpose of illustration without suggesting any limitations. In some other example embodiments, any suitable event may be applied for triggering the retransmission of the indication. In this way, the re-transmission of the indication may be performed in time.

Alternatively, the re-transmission of the indication may be controlled according to both the first timer and the specific events. More specifically, when the first device 110 determines that the response indicating that the RRC connection is not resumed, the first device 110 starts the first timer and detecting the specific events simultaneously. In response to either the expiration of the first timer or detecting the specific events, the first device 110 re-transmits the indication to the second device. In this way, the ongoing SDT is not disturbed by using the first timer while the RRC resume procedure could be allowed to be immediately triggered after the SDT procedure.

In some example embodiments, the first device 110 may transmit the indication on a DCCH. Further, the indication may be transmitted via any suitable signalling. One example of the signalling is a RRC signalling. Another example of the signalling is a physical (PHY) layer signalling. A further example of the signalling is a media access control (MAC) layer signalling. In addition, the signalling may be implemented by re-using any existing signalling or defining a newly-defined signalling. In this way, the first device 110 may transmit the indication in a more flexible manner.

In some example embodiments, the first device 110 is performing a RACH-based SDT procedure and the RACH-based SDT procedure is not complete. In this event, the first device 110 may terminate the RA procedure for the SDT procedure and transmit the indication to the second device 120. Additionally, the first device 110 terminates the RA procedure merely when the cause resulting in the data is one of pre-defined causes. By way of example rather than limitation, examples of the pre-defined causes are emergency, highPriorityAccess, mt-Access, mo-VoiceCall, mo-VideoCall, mo-SMS, rna-Update, mps-PriorityAccess, or mcs-PriorityAccess.

In some example embodiments, the first device 110 may re-uses the existing RRC resume request as a message/signaling that carries the indication. In some example embodiments, the indication is transmitted via CCCH. In this way, stipulating new signalling is avoided.

In case that the second device 120 has not been aware of the RA for the SDT procedure, no additional processes are needed at the second device 120. Additionally, the second device 120 needs to terminate the RA procedure for the SDT procedure for some specific scenarios. For example, when the second device 120 receives an indication from the first device 110 after receiving Msg 1 from the first device 110, the second device 120 may terminate all the subsequent process about the RACH-based SDT (such as, terminating transmitting Msg 2 to the first device 110, or disabling transmitting possible DL SDT data to the first device 110).

In this solution, in addition to indicating the presence of non-small data transmission data needed to be transmitted by the first device in a connected state (i.e., non-SDT transmission), the terminal device also indicates the information associated with the data to the network device, such that the network device may make a proper and reasonable determination about whether to resume the RRC connection with the terminal device and whether to stop the ongoing SDT procedure. This solution especially benefits the scenario where the network device is in an overload situation or the SDT data has a higher transmission priority than that of the non-SDT data.

Figure 3:
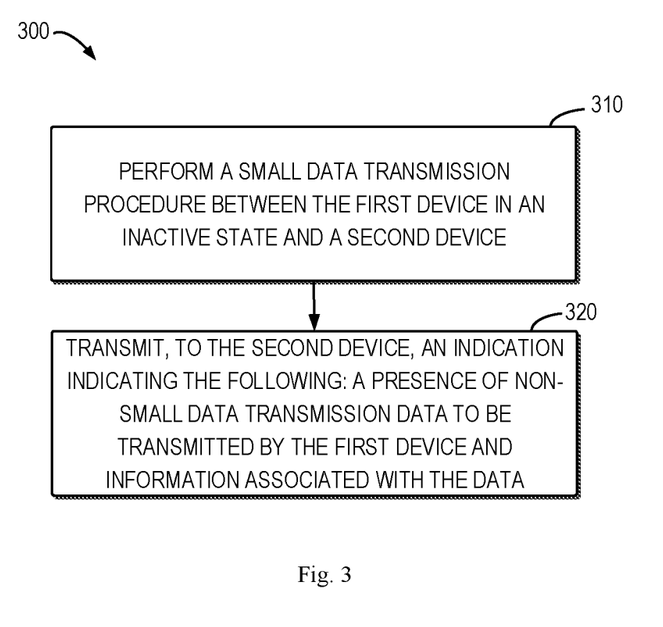
FIG. 3 illustrates a flowchart of a method implemented at a first device according to some example embodiments of the present disclosure.

FIG. 3 shows a flowchart of an example method 300 implemented at a first device 110 in accordance with some example embodiments of the present disclosure. For the purpose of discussion, the method 300 will be described from the perspective of the first device 110 with respect to FIG. 1. It is to be understood that the method 300 may include additional blocks not shown and/or may omit some shown blocks, and the scope of the present disclosure is not limited in this regard.

At block 310, the first device 110 performs a SDT procedure between a first device 110 in an inactive state and the second device 120.

At block 320, the first device transmits, to the second device 120, an indication indicating the following: a presence of non-small data transmission data to be transmitted by the first device 110 in a connected state and information associated with the data.

In some example embodiments, the information associated with the data indicates at least one of the following: a radio bearer corresponding to the data, a priority of the data, or a cause resulting in the data.

In some example embodiments, the first device 110 determines whether the first device 110 to transmit the indication for the data according to a configuration. The first device 110 further transmits the indication to the second device 120 if the first device 110 determines that the indication is allowed to be transmitted.

In some example embodiments, the configuration is pre-defined at the first device 110 or received from the second device 120.

In some example embodiments, the first device 110 obtains the configuration by a NAS of the first device 110 and from an AS of the first device 110, and determines whether the indication is allowed to be transmitted according to the configuration at a NAS of the first device 110.

In some example embodiments, if the first device 110 determines that the indication is allowed to be transmitted, the first device 110 indicates the presence of the data by the NAS to the AS.

In some example embodiments, the first device 110 if the first device 110 determines that the indication is not allowed to be transmitted, the first device 110 disables indicating presence of the data to the AS by the NAS. Further, in response to receiving an indication that a SDT between the first and second devices 120 is complete, the first device 110 enables indicating the presence of the data to the AS by the NAS.

In some example embodiments, the first device 110 starts a first timer upon receipt of a response indicating that the RRC connection is not allowed to be resumed. Further, the first device 110 re-transmits the indication to the second device 120 in response to an expiration of the first timer.

In some example embodiments, the first device 110 receives from the second device 120, a response indicating whether a RRC connection between the first and second devices is resumed.

In some example embodiments, if the first device 110 determines that the response indicates that the RRC connection is not resumed, the first device 110 re-transmits the indication to the second device 120 in response to a completion of the SDT procedure between the first and second devices 120.

In some example embodiments, duration of the timer is determined from the response.

In some example embodiments, the first device 110 starts a second timer for the indication upon transmission of the indication, and indicates the expiration of the second timer to a NAS of the first device 110 in response to an expiration of the second timer.

In some example embodiments, if the first device 110 determines that a cause resulting in the data is one of pre-defined causes, the first device 110 terminates a RA procedure for the SDT procedure between the first and second devices 120. Further, the first device 110 transmits the indication to the second device 120.

In some example embodiments, the indication is transmitted on a dedicated control channel, or transmitted via a RRC signalling, a physical layer signalling or a media access control layer signalling.

In some example embodiments, the first device 110 is a terminal device and the second device 120 is a network device.

A first apparatus capable of performing the method 300 may comprise means for performing the respective operations of the method 300. The means may be implemented in any suitable form. For example, the means may be implemented in a circuitry or software module. The first apparatus may be implemented as or included in the first device 110.

In some example embodiments, the first apparatus comprises means for performing at a first apparatus a SDT procedure between the first apparatus in an inactive state and the second device. The first apparatus further comprises means for transmitting, to the second device, an indication indicating the following: a presence of non-small data transmission data to be transmitted by the first apparatus in a connected state and information associated with the data.

In some example embodiments, the information associated with the data indicates at least one of the following: a radio bearer corresponding to the data, a priority of the data, or a cause resulting in the data.

In some example embodiments, means for transmitting the indication comprises means for determining, according to a configuration, whether the first apparatus to transmit the indication for the data, and means for in accordance with a determination that the indication is allowed to be transmitted, transmitting the indication to the second apparatus.

In some example embodiments, the configuration is pre-defined at the first apparatus or received from the second apparatus.

In some example embodiments, the first apparatus further comprises means for obtaining the configuration by a NAS of the first apparatus and from an AS of the first apparatus, and means for determining whether the indication is allowed to be transmitted according to the configuration at a NAS of the first apparatus.

In some example embodiments, the first apparatus further comprises means for in accordance with a determination that the indication is allowed to be transmitted, indicating the presence of the data by the NAS to the AS.

In some example embodiments, the first apparatus further comprises means for in accordance with a determination that the indication is not allowed to be transmitted, disabling indicating presence of the data to the AS by the NAS, and means for in response to receiving an indication that a SDT between the first and second apparatuses is complete, enabling indicating the presence of the data to the AS by the NAS.

In some example embodiments, the first apparatus further comprises means for receiving from the second apparatus, a response indicating whether a RRC connection between the first and second apparatuses is resumed.

In some example embodiments, the first apparatus further comprises means for starting a first timer upon receipt of a response indicating that the RRC connection is resumed, and means for in response to an expiration of the first timer, re-transmitting the indication to the second apparatus.

In some example embodiments, the first apparatus further comprises means for in accordance with a determination that the response indicates that the RRC connection is not resumed, re-transmitting the indication to the second apparatus in response to a completion of a SDT procedure between the first and second apparatuses.

In some example embodiments, duration of the timer is determined from the response.

In some example embodiments, the first apparatus further comprises means for starting a second timer for the indication upon transmission of the indication, and means for in response to an expiration of the second timer, indicating the expiration of the second timer to a NAS of the first apparatus.

In some example embodiments, means for transmitting the indication comprises means for in accordance with a determination that a cause resulting in the data is one of pre-defined causes, terminating a RA procedure for the SDT procedure in between the first and second apparatuses, and means for transmitting the indication to the second apparatus.

In some example embodiments, the indication is transmitted on a dedicated control channel, or transmitted via a RRC signalling, a physical layer signalling or a media access control layer signalling.

In some example embodiments, the first apparatus is a terminal apparatus and the second apparatus is a network apparatus.

Figure 4:
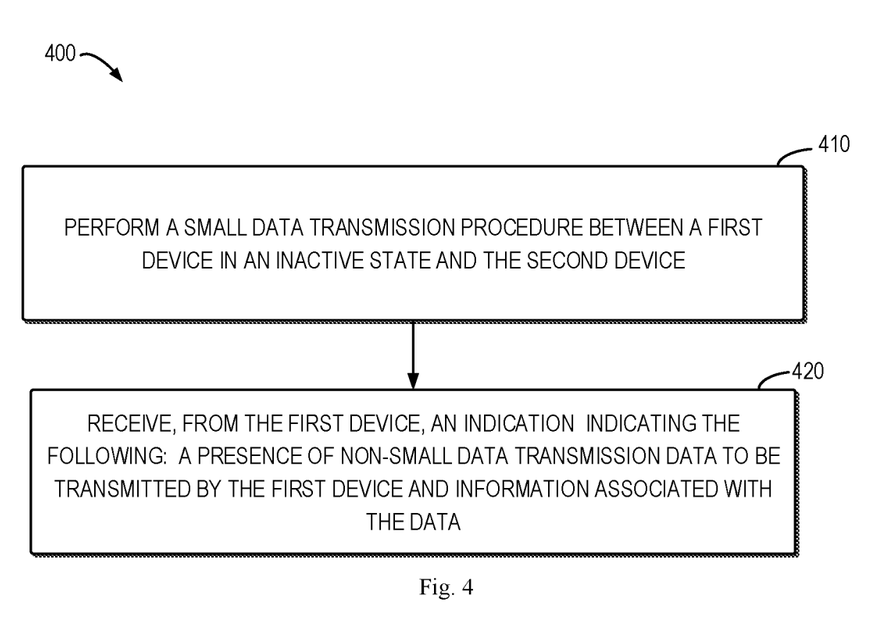
FIG. 4 illustrates a flowchart of a method implemented at a second device according to some other example embodiments of the present disclosure.

FIG. 4 shows a flowchart of an example method 400 implemented at a second device 120 in accordance with some example embodiments of the present disclosure. For the purpose of discussion, the method 400 will be described from the perspective of the second device 120 with respect to FIG. 1. It is to be understood that the method 400 may include additional blocks not shown and/or may omit some shown blocks, and the scope of the present disclosure is not limited in this regard.

At block 410, the second device 120 performs a SDT procedure between a first device in an inactive state and the second device.

At block 420, the second device 120 receives, from the first device 110, an indication indicating the following: a presence of non-small data transmission data to be transmitted by the first device 110 in a connected state and information associated with the data.

In some example embodiments, the second device 120 determines, based on the information associated with the data, whether to resume a RRC connection between the first and the second devices; and transmits, to the first device 110, a response indicating whether the RRC connection is resumed.

In some example embodiments, the information associated with the data indicating at least one of the following: a radio bearer corresponding to the data, a priority of the data, or a cause resulting in the data.

In some example embodiments, the second device 120 transmits a configuration to be used by the first device 110 for determining whether the first device 110 is allowed to transmit the indication for the data to the first device 110.

In some example embodiments, if the second device 120 determines not to resume the RRC connection, the second device 120 transmits the response further indicating duration of a first timer to be used by the first device 110 for re-transmitting the indication.

In some example embodiments, the second device 120 terminates a RA procedure for a SDT procedure between the first and second devices 120 in response to receiving the indication from the first device 110.

In some example embodiments, the indication is received on a dedicated control channel, or received via a RRC signalling, a physical layer signalling or a media access control layer signalling.

In some example embodiments, the first device 110 is a terminal device and the second device 120 is a network device.

A second apparatus capable of performing the method 400 may comprise means for performing the respective operations of the method 400. The means may be implemented in any suitable form. For example, the means may be implemented in a circuitry or software module. The second apparatus may be implemented as or included in the second device 120.

In some example embodiments, the second apparatus comprises means for means for performing at a second apparatus a SDT procedure between a first apparatus in an inactive state and the second device. The second apparatus further comprises means for receiving, from the first device, an indication indicating the following: a presence of non-small data transmission data to be transmitted by the first apparatus in a connected state and information associated with the data.

In some example embodiments, the information associated with the data indicating at least one of the following: a radio bearer corresponding to the data, a priority of the data, or a cause resulting in the data.

In some example embodiments, the second apparatus comprises means for transmitting, to the first apparatus, a configuration to be used by the first apparatus for determining whether the first apparatus is allowed to transmit the indication for the data.

In some example embodiments, means for transmitting the response comprises: means for in accordance with a determination not to resume the RRC connection, transmitting the response further indicating duration of a first timer to be used by the first apparatus for re-transmitting the indication.

In some example embodiments, the second apparatus further comprises means for terminating a RA procedure for the SDT procedure between the first and second apparatuses in response to receiving the indication from the first apparatus.

In some example embodiments, the indication is received on a dedicated control channel, or received via a RRC signalling, a physical layer signalling or a media access control layer signalling.

In some example embodiments, the first apparatus is a terminal apparatus and the second apparatus is a network apparatus.

Figure 5:
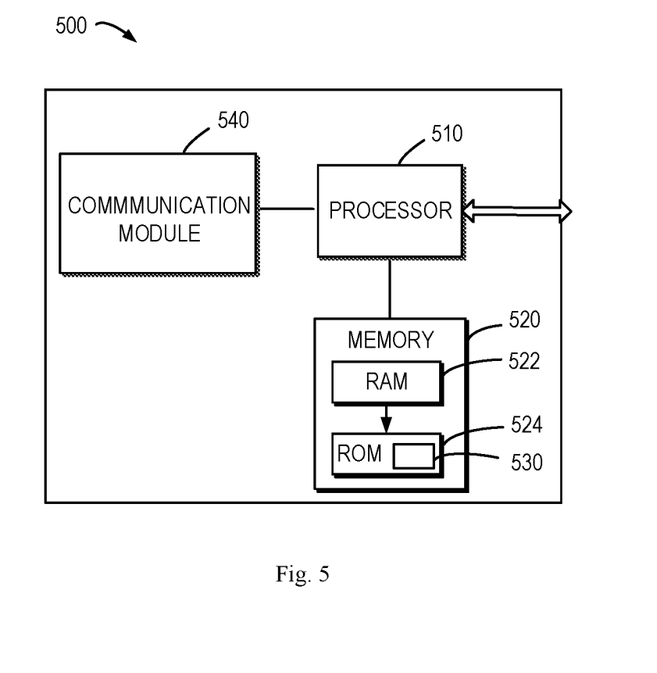
FIG. 5 illustrates a simplified block diagram of an apparatus that is suitable for implementing example embodiments of the present disclosure.

FIG. 5 is a simplified block diagram of a device 500 that is suitable for implementing embodiments of the present disclosure. The device 500 may be provided to implement a communication device, for example, the first device 110 and the second device 120 as shown in FIG. 1. As shown, the device 500 includes one or more processors 510, one or more memories 520 coupled to the processor 510, and one or more communication modules 540 (such as, transmitters and/or receivers) coupled to the processor 510.

The communication module 540 is for bidirectional communications. The communication module 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 520. The processor 510 may perform any suitable actions and processing by loading the program 530 into the RAM 520.

The embodiments of the present disclosure may be implemented by means of the program 530 so that the device 500 may perform any process of the disclosure as discussed with reference to FIGS. 2-4. The embodiments of the present disclosure may also be implemented by hardware or by a combination of software and hardware.

Figure 6:
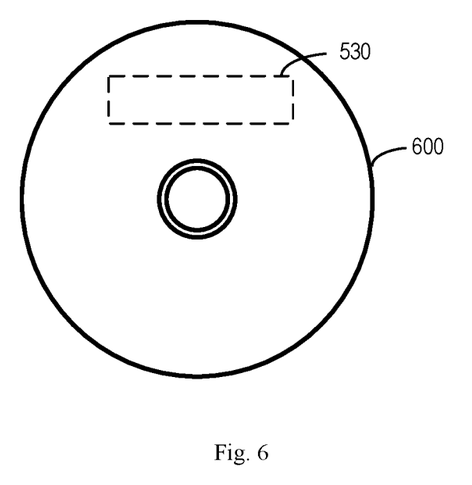
FIG. 6 illustrates a block diagram of an example computer readable medium in accordance with some example embodiments of the present disclosure.

In some embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 6 shows an example of the computer readable medium 600 in form of CD or DVD. The computer readable medium has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 or 400 as described above with reference to FIG. 3 or FIG. 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as information associated with the data of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one memory including computer program code;
   wherein the at least one memory and the computer program code are configured to, with the at least one processor, cause the first device to:
   perform a small data transmission procedure between the first device in an inactive state and a second device; and
   transmit, to the second device, responsive to a presence of non-small data transmission data in a buffer of a radio bearer that is not configured for small data transmission, an indication indicating the following:
   the presence of non-small data transmission data to be transmitted by the first device, and
   information associated with the non-small data transmission data.

2. The first device of claim 1, wherein the information associated with the non-small data transmission data indicates at least one of the following:
- a radio bearer corresponding to the non-small data transmission data,
- a priority of the non-small data transmission data, or
- a cause resulting in the non-small data transmission data.

3. The first device of claim 1, wherein the at least one memory and the computer program code are configured to, with the at least one processor, cause the first device to transmit the indication by:
- determining, according to a configuration, whether the first device is allowed to transmit the indication for the non-small data transmission data; and
- in accordance with a determination that the indication is allowed to be transmitted, transmitting the indication to the second device.

4. The first device of claim 3, wherein the configuration is pre-defined at the first device or received from the second device.

5. The first device of claim 1, wherein the at least one memory and the computer program code are configured to, with the at least one processor, further cause the first device to:
- receive a response, from the second device, comprising a determination, based on the information associated with the non-small data transmission, indicating whether a Radio Resource Control (RRC) connection between the first device and the second device is resumed.

6. The first device of claim 1, wherein the at least one memory and the computer program code are configured to, with the at least one processor, further cause the first device to:
- start a first timer upon receipt of a response indicating that the radio resource control connection is not resumed; and
- in response to an expiration of the first timer, re-transmit the indication to the second device.

7. The first device of claim 6, wherein duration of the first timer is determined from the response.

8. The first device of claim 1, wherein the at least one memory and the computer program code are configured to, with the at least one processor, further cause the first device to:
- in accordance with a determination that the response indicates that the radio resource control connection is not resumed, re-transmit the indication to the second device in response to a completion of the small data transmission procedure.

9. The first device of claim 1, wherein the at least one memory and the computer program code are configured to, with the at least one processor, further cause the first device to:
- start a second timer for the indication upon transmission of the indication; and
- in response to an expiration of the second timer, indicate the expiration of the second timer to a non-access stratum of the first device.

10. The first device of claim 1, wherein the indication is transmitted on a dedicated control channel, or transmitted via a radio resource control signalling a physical layer signalling or a media access control layer signalling.

11. The first device of claim 1, wherein the first device is a terminal device and the second device is a network device.

12. A second device comprising:
at least one processor; and
at least one memory including computer program code;
wherein the at least one memory and the computer program code are configured to, with the at least one processor, cause the second device to:
- perform a small data transmission procedure between a first device in an inactive state and the second device; and
- receive, from the first device, responsive to a presence of non-small data transmission data in a buffer of a radio bearer that is not configured for small data transmission, an indication indicating the following:
  - the presence of non-small data transmission data to be transmitted by the first device, and
  - information associated with the non-small data transmission data.

13. The second device of claim 12, wherein the at least one memory and the computer program code are configured to, with the at least one processor, further cause the second device to:
- determine, based on the information associated with the non-small data transmission data, whether to resume a Radio Resource Control (RRC) connection between the first device and the second device; and
- transmit a response, to the first device, comprising a determination indicating whether the RRC connection between the first device and the second device is resumed.

14. The second device of claim 12, wherein the information associated with the non-small data transmission data indicates at least one of the following:
- a radio bearer corresponding to the non-small data transmission data,
- a priority of the non-small data transmission data, or
- a cause resulting in the non-small data transmission data.

15. The second device of claim 12, wherein the at least one memory and the computer program code are configured to, with the at least one processor, further cause the second device to:
- transmit, to the first device, a configuration to be used by the first device for determining whether the first device is allowed to transmit the indication for the non-small data transmission data.

16. The second device of claim 12, wherein the at least one memory and the computer program code are configured to, with the at least one processor, cause the second device to transmit the response by:
- in accordance with a determination not to resume the radio resource control connection, transmitting the response further indicating duration of a first timer to be used by the first device for re-transmitting the indication.

17. The second device of claim 12, wherein the indication is received on a dedicated control channel, or received via a radio resource control signalling, a physical layer signalling or a media access control layer signalling.

18. The second device of claim 12, wherein the first device is a terminal device and the second device is a network device.

19. A method comprising:
- performing at a first device a small data transmission procedure between the first device in an inactive state and a second device; and
- transmitting, to the second device, responsive to a presence of non-small data transmission data in a buffer of a radio bearer that is not configured for small data transmission, an indication indicating the following:
the presence of non-small data transmission data to be transmitted by the first device, and
information associated with the non-small data transmission data.

20. The method of claim 19, wherein the information associated with the data indicates at least one of the following:
a radio bearer corresponding to the non-small data transmission data,
a priority of the non-small data transmission data, or
a cause resulting in the non-small data transmission data.

21. The method of claim 19, wherein transmitting the indication comprises:
determining, according to a configuration, whether the first device is allowed to transmit the indication for the non-small data transmission data; and
in accordance with a determination that the indication is allowed to be transmitted, transmitting the indication to the second device.

22. The method of claim 21, wherein the configuration is pre-defined at the first device or received from the second device.

23. The method of claim 19, further comprising:
receiving a response, from the second device, comprising a determination, based on the information associated with the non-small data transmission, indicating whether a Radio Resource Control (RRC) connection between the first device and the second device is resumed.

24. The method of claim 19, further comprising:
starting a first timer upon receipt of a response indicating that the radio resource control connection is not resumed; and
in response to an expiration of the first timer, re-transmitting the indication to the second device.

25. The method of claim 24, wherein duration of the timer is determined from the response.

26. The method of claim 19, further comprising:
in accordance with a determination that the response indicates that the radio resource control connection is not resumed, re-transmitting the indication to the second device in response to a completion of the small data transmission procedure.

27. The method of claim 19, further comprising:
starting a second timer for the indication upon transmission of the indication; and
in response to an expiration of the second timer, indicating the expiration of the second timer to a non-access stratum of the first device.

28. The method of claim 19, wherein the indication is transmitted on a dedicated control channel, or transmitted via a radio resource control signalling, a physical layer signalling or a media access control layer signalling.

29. The method of claim 19, wherein the first device is a terminal device and the second device is a network device.

30. A method comprising:
performing at a second device a small data transmission procedure between a first device in an inactive state and the second device; and
receiving, from the first device, responsive to a presence of non-small data transmission data in a buffer of a radio bearer that is not configured for small data transmission, an indication indicating the following:
the presence of non-small data transmission data to be transmitted by the first device, and
information associated with the non-small data transmission data.

31. The method of claim 30, wherein the information associated with the data indicates at least one of the following:
a radio bearer corresponding to the non-small data transmission data,
a priority of the non-small data transmission data, or
a cause resulting in the non-small data transmission data.

32. The method of claim 30, further comprising:
transmitting, to the first device, a configuration to be used by the first device for determining whether the first device is allowed to transmit the indication for the non-small data transmission data.

33. The method of claim 30, wherein transmitting the response comprises:
in accordance with a determination not to resume the radio resource control connection, transmitting the response further indicating duration of a first timer to be used by the first device for re-transmitting the indication.

34. The method of claim 30, wherein the indication is received on a dedicated control channel, or received via a radio resource control signalling, a physical layer signalling or a media access control layer signalling.

35. The method of claim 30, wherein the first device is a terminal device and the second device is a network device.

36. A non-transitory computer readable medium comprising a computer program thereon, the computer program when executed by a processor of a first device, causing the first device to:
perform at a first device a small data transmission procedure between the first device in an inactive state and a second device; and
transmit, to the second device, responsive to a presence of non-small data transmission data in a buffer of a radio bearer that is not configured for small data transmission, an indication indicating the following:
the presence of non-small data transmission data to be transmitted by the first device, and
information associated with the non-small data transmission data.

37. A non-transitory computer readable medium comprising a computer program thereon, the computer program when executed by a processor of a second device, causing the device to:
perform at a second device a small data transmission procedure between a first device in an inactive state and the second device; and
receive, from the first device, responsive to a presence of non-small data transmission data in a buffer of a radio bearer that is not configured for small data transmission, an indication indicating the following:
the presence of non-small data transmission data to be transmitted by the first device, and
information associated with the non-small data transmission data.

* * * * *